United States Patent [19]
Freche et al.

[11] Patent Number: 5,476,897
[45] Date of Patent: Dec. 19, 1995

[54] PROCESS FOR THE PRODUCTION OF HIGH SOLIDS LATEX

[75] Inventors: Patrick A. R. Freche, Limours; Pascale F. J. Muller, Vanves, both of France

[73] Assignee: The GoodYear Tire & Rubber Company, Akron, Ohio

[21] Appl. No.: 324,197

[22] Filed: Oct. 17, 1994

[51] Int. Cl.$^6$ ............................ C08L 33/06; C08K 5/101
[52] U.S. Cl. ..................... 524/532; 524/562; 524/824; 524/831; 524/833; 523/201; 525/301
[58] Field of Search ...................... 524/562, 824, 524/831, 833, 533; 523/201; 525/301

[56] References Cited

U.S. PATENT DOCUMENTS

| | | | |
|---|---|---|---|
| 4,130,523 | 12/1978 | Hoy et al. ............................ | 523/305 |
| 5,284,905 | 2/1994 | Chen et al. ............................ | 523/201 |

*Primary Examiner*—Paul R. Michl
*Assistant Examiner*—Olga Asinovsky
*Attorney, Agent, or Firm*—Alvin T. Rockhill

[57] ABSTRACT

This invention discloses a process for preparing a latex having a high solids content which comprises the steps of (1) terpolymerizing a vinyl aromatic monomer, an alkyl propenoic acid ester, and an alkyl propenoic acid monomer in an aqueous polymerization medium by free radical polymerization in a first polymerization step to produce a seed polymer latex; (2) neutralizing the seed polymer latex to a pH of about 7 to about 10 by the addition of an alkali to produce a neutralized seed polymer latex; (3) adding additional vinyl aromatic monomer and alkyl propenoic acid ester to the neutralized seed polymer latex and allowing the additional vinyl aromatic monomer and the additional alkyl propenoic acid ester to polymerize in a second polymerization step to a solids content of at least about 40% to produce the latex having the high solids content; wherein about 20 percent to about 40 percent of the total amount of monomers polymerized in the first polymerization step and the second polymerization step are polymerized in the first polymerization step; and wherein the additional vinyl aromatic monomer and the additional alkyl propenoic acid ester are added in the second polymerization step at rate whereby a monomer conversion of at least 85 percent is maintained at all times.

21 Claims, No Drawings

PROCESS FOR THE PRODUCTION OF HIGH SOLIDS LATEX

BACKGROUND OF THE INVENTION

Latices which contain resins that are derived from a vinyl aromatic monomer, an alkyl propenoic acid ester monomer, and an alkyl propenoic acid monomer are useful in a variety of applications. For instance, such latices are useful in paint formulations. They are normally made utilizing free radical emulsion polymerization techniques. However, when standard "double batch" emulsion polymerization procedures are employed a solids content in excess of about 35% to 40% can not be achieved without the formation of microcoagulum.

In many cases it would be highly desirable to synthesize latices having solids contents which are greater than 40%. It would also be desirable to produce latices which can be used in making paint formulations which have improved storage stability.

SUMMARY OF THE INVENTION

By utilizing the techniques of this invention, latices can by synthesized which have solids contents of greater than 40%. In fact, latices having solids contents of up to about 50% can by synthesized without the formation of microcoagulum being encountered. Such latices can be used in making paint formulations which have improved storage stability.

This invention more specifically discloses a process for preparing a latex having a high solids content which comprises the steps of (1) terpolymerizing a vinyl aromatic monomer, an alkyl propenoic acid ester monomer, and an alkyl propenoic acid monomer in an aqueous polymerization medium by free radical polymerization in a first polymerization step to produce a seed polymer latex; (2) neutralizing the seed polymer latex to a pH of about 7 to about 10 by the addition of an alkali to produce a neutralized seed polymer latex; (3) adding additional vinyl aromatic monomer and alkyl propenoic acid ester monomer to the neutralized seed polymer latex and allowing the additional vinyl aromatic monomer and the additional alkyl propenoic acid ester monomer to polymerize in a second polymerization step to a solids content of at least about 40% to produce the latex having the high solids content; wherein about 20 percent to about 40 percent of the total amount of monomers polymerized in the first polymerization step and the second polymerization step are polymerized in the first polymerization step; and wherein the additional vinyl aromatic monomer and the additional alkyl propenoic acid ester monomer are added in the second polymerization step at rate whereby a monomer conversion of at least 85 percent is maintained at all times.

DETAILED DESCRIPTION OF THE INVENTION

The first step of the process of this invention is carried out by adding a vinyl aromatic monomer, an alkyl propenoic acid ester monomer, an alkyl propenoic acid monomer and a surfactant to water to form an aqueous polymerization medium. Terpolymerization of the three monomers is then initiated with a free radical generator. The latex made in this polymerization step is subsequently employed as a seed polymer latex in subsequent polymerization.

Generally, any Vinyl aromatic monomer which is known to polymerize in free radical systems can be used. Such vinyl aromatic monomers typically contain from 8 to 20 carbon atoms. Usually, the vinyl aromatic monomer will contain from 8 to 14 carbon atoms. Some representative examples of vinyl aromatic monomers that can be utilized include styrene, 1-vinyl napthalene, 2-vinyl napthalene, 3-methyl styrene, 4-propyl styrene, t-butyl styrene, 4-cyclohexyl styrene, 4-dodecyl styrene, 2-ethyl-4-benzyl styrene, 4-(phenylbutyl) styrene, and the like. Styrene is generally the most preferred vinyl aromatic monomer.

The alkyl propenoic acid ester monomers that can be used generally have the structural formula:

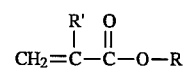

wherein R represents an alkyl group containing from 1 to 10 carbon atoms ($R=C_nH_{2n+1}$ with n being an interger from 1 to 8) and wherein R' represents a hydrogen atom or a methyl group ($R'=C_nH_{2n+1}$ with n being 0 or 1). In cases where R' is a methyl group the alkyl propenoic acid ester monomer can be more fully described as being an alkyl methacrylate monomer. Methyl methacrylate, ethyl methacrylate, propyl methacrylate, and n-butyl methacrylate are representative examples of alkyl methacrylate monomers which could be used. The alkyl group in the alkyl propenoic acid ester monomer will preferably contain from 1 to 4 carbon atoms with alkyl groups which contain 4 carbon atoms being most preferred. Accordingly, methyl acrylate, ethyl acrylate, propyl acrylate, and butyl acrylate are preferred alkyl propenoic acid ester monomers with butyl acrylate being the most preferred. The alkyl groups in such alkyl propenoic acid ester monomers can be straight chained or branched. Thus, normal-propyl acrylate, isopropyl acrylate, normal-butyl acrylate, or tertiary-butyl acrylate can be employed. Normal-butyl acrylate is a particularly preferred monomer.

The alkyl propenoic acid monomers that can be used have the structural formula:

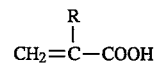

wherein R represents a hydrogen atom or an alkyl group containing from 1 to 4 carbon atoms. The R group can accordingly be represented by the formula $-C_nH_{2n+1}$ wherein n is an integer from 0 to 4. Some representative examples of alkyl propenoic acid monomers which can be used include: methacrylic acid (2-methylpropenoic acid), 2-ethylpropenoic acid, 2-propylpropenoic acid, and 2-butylpropenoic acid.

Essentially any type of free radical generator can be used to initiate such free radical emulsion polymerizations. For example, free radical generating chemical compounds, ultraviolet light or radiation can be used. In order to ensure a satisfactory polymerization rate, uniformity, and a controllable polymerization, free radical generating chemical agents are generally used with good results.

Some representative examples of free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo- 2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy) cyclohexane, and the like. Persulfate initiators, such as potassium persulfate and ammonium persulfate are especially useful in such aqueous emulsion polymerizations.

The amount of initiator employed will vary with the monomers being polymerized and with the desired molecular weight of the terpolymer being synthesized. Higher molecular weights are achieved by utilizing smaller quantities of the initiator and lower molecular weights are attained by employing larger quantities of the initiator. However, an a general rule from 0.005 to 1 phm (parts by weight per 100 parts by weight of monomer) of the initiator will be included in the reaction mixture. In the case of metal persulfate initiators most commonly from 0.1 to 0.5 phm will be employed in the polymerization medium.

A wide variety of types of emulsifiers or surfactants can be utilized in the process of this invention. For instance, rosin acid or fatty acid emulsifiers can be utilized. However, synthetic surfactants are normally preferred. Salts of alkyl sulfates, alkyl sulfonates and alkyl phosphates are particularly preferred for utilization as emulsifiers. The alkyl groups in these compounds generally contain from 1 to 30 carbon atoms. Normally the alkyl groups in these surfactants will contain from 8 to 20 carbon atoms. The surfactant utilized will normally be a sodium, potassium, magnesium or ammonium salt. Sodium lauryl sulfate, ammonium lauryl sulfate, sodium dodecyl benzene sulfonate, and sodium dodecyl sulfate are some representative examples of highly suitable emulsifiers.

Generally from about 0,005 phm to about 0.5 phm of emulsifier is utilized in preparing the aqueous polymerization medium. In most cases, it will be preferred to utilize from about 0.01 phm to 0.1 phm of emulsifier. It is normally more preferred to utilize from about 0.04 phm to about 0.08 phm of the emulsifier. The precise amount of emulsifier required in order to attain optimal results will, of course, vary with the specific emulsifier being used. However, persons skilled in the art will be able to easily ascertain the specific amount of emulsifier required in order to attain optimal results.

The free radical emulsion polymerization will typically be carried out in the first polymerization step at a temperature which is within the range of about 65° C. to about 99° C. It is generally preferred for the first polymerization step to be carried out at a temperature which is within the range of about 80° C. to about 98° C. It is normally more preferred for the first polymerization step to be carried out at a temperature which is within the range of about 90° C. to about 95° C.

In the first polymerization step normally about 20 percent to about 40 percent of the total amount of monomers polymerized in the first polymerization step and the second polymerization step are polymerized. It is generally preferred for about 25 percent to about 36 percent of the total amount of monomers polymerized in the first polymerization step and the second polymerization step to be polymerized in the first polymerization step. It is normally more preferred for about 28 percent to about 33 percent of the total amount of monomers polymerized in the first polymerization step and the second polymerization step to be polymerized in the first polymerization step.

Generally all of the alkyl propenoic acid monomer will be added in the first polymerization step. In any case, at least about 90 percent of the total amount of alkyl propenoic acid monomer polymerized in the first polymerization step and the second polymerization step is polymerized in the first polymerization step. It is normally preferred for at least about 95 percent of the total amount of the alkyl propenoic acid monomer polymerized to be polymerized in the first polymerization step with it being more preferred for at least about 99 percent of the total amount of the alkyl propenoic acid monomer polymerized to be polymerized in the first polymerization step. As a matter of convenience all (100%) of the alkyl propenoic acid monomer polymerized is polymerized in the first polymerization step.

As the polymerization proceeds in the first step of the process of this invention the pH of the polymerization medium stabilizes at a level of about 4. As the polymerization proceeds the solids content of the latex being synthesized also increases.

After completing the first polymerization step the seed polymer latex made is neutralized to a pH which is within the range of about 7 to about 10 by the addition of an alkali. The latex is preferably neutralized to a pH which is within the range of about 9 to about 10. The alkali will typically be added to the latex as an aqueous solution. For instance, an aqueous solution of ammonia can be added to the seed polymer latex to adjust its pH. This neutralization step will typically be carried out over a period of about 15 minutes to about 8 hours. The neutralization step will more typically be carried out over a period of about 30 minutes to about 3 hours and will preferably be carried out over a period of 45 minutes to 90 minutes.

After the seed polymer latex has been neutralized additional vinyl aromatic monomer and additional alkyl propenoic acid ester monomer are added to the neutralized seed polymer latex. During this step the vinyl aromatic monomer and alkyl propenoic acid ester monomer are added to the polymerization medium over a period of about 1 hour to about 6 hours. It is preferred for the period of monomer addition to be within the range of about 1.5 hours to about 4 hours. In any case, it is critical for the additional vinyl aromatic monomer and the additional alkyl propenoic acid ester monomer to be added in the second polymerization step at rate whereby a monomer conversion of at least 85 percent is maintained at all times. It is preferred for the additional vinyl aromatic monomer and the additional alkyl propenoic acid ester monomer to be added in the second polymerization step at rate whereby a monomer conversion of at least 90 percent is maintained at all times.

The second polymerization step will normally be conducted at a temperature which is within the range of about 50° C. to about 90° C. It is generally preferred for the second polymerization step to be carried out at a temperature which is within the range of about 55° C. to about 85° C. It is normally more preferred for the second polymerization step to be carried out at a temperature which is within the range of about 60° C. to about 80° C.

After the addition of the additional monomers to the polymerization medium has begun the polymerization will continues as a second polymerization step. The second polymerization step is allowed to continue until a very high conversion of monomers to polymer is attained. Typically the conversion reached will be in excess of about 95 percent. More typically monomer conversions in excess of about 98 percent will be attained with it being preferred for an essentially quantitative conversion in excess of 99 percent to be realized.

The solids content which is reached in the second polymerization step will normally be in excess of about 40 percent. The solids content reached in the second polymerization step will normally be within the range of about 40 percent to about 50 percent.

The monomer ratios utilized in making the latex for paint applications is critical. In most cases the monomer charge composition employed in making the latex will contain from 58 phm (parts by weight per 100 parts by weight of monomer) to 72 phm of the vinyl aromatic monomer, from about 27 phm to 37 phm of the alkyl propenoic acid ester monomer, and from 1 phm to 5 phm of the alkyl propenoic acid monomer. It is preferred for the monomer charge composition employed in making the latex to contain from 62 phm to 70 phm of the vinyl aromatic monomer, from about 28 phm to 34 phm of the alkyl propenoic acid ester monomer, and from 2 phm to 4 phm of the alkyl propenoic acid monomer.

After the latex is synthesized by employing the techniques of this invention it can be used in the preparation of paints which have improved storage stability. The latex can be employed in making paint formulations utilizing standard procedures which are well known to persons skilled in the art. One such procedure simply involves mixing the latex with wetting agents, coalescing agents, thickening agents, plasticizers, and pigments. It is, of course, not necessary to include pigments in clear coat formulations where color is not desired.

This invention is illustrated by the following examples which are merely for the purpose of illustration and are not to be regarded as limiting the scope of the invention or the manner in which it can be practiced. Unless specifically indicated otherwise all parts and percentages are given by weight.

EXAMPLE 1

In this experiment a latex was synthesized utilizing the techniques of this invention. In the procedure used 125 phm of water, 20 phm of styrene, 9 phm of n-butyl acrylate, 3 phm of methacrylic acid, and 0.18 phm of sodium dodecylsulfate (as a 28% aqueous solution) were initially charged into a 5 liter reactor. The polymerization medium was then heated to a temperature of about 70° C. and polymerization was initiated by the addition of 5 phm of a 5% aqueous solution of potassium persulfate. After polymerization was initiated the temperature of the polymerization increased to about 92° C. and the polymerization medium was maintained at the temperature of about 92° C. for the duration of the first polymerization step.

The latex was then neutralized by charging about 8 phm of a 10% aqueous ammonia solution into the reactor. The temperature of the polymerization medium was also reduced to about 70° C.

After the latex was neutralized 47 phm of additional styrene and 21 phm of additional n-butyl acrylate were slowly charged into the polymerization medium. The additional monomers were added to the polymerization medium in the second polymerization step at a rate whereby a monomer conversion of at least 85% was maintained throughout the second polymerization step. The solids content of the latex being prepared was monitored to insure that the monomers were being added at a rate which was slow enough to maintain a conversion of at least 85% at all times during the second polymerization step. The temperature was maintained at about 70° C. throughout the second polymerization step.

Microcoagulum formation did not occur during either the first polymerization step or the second polymerization step. This is despite the fact that a final solids content of over 40% was achieved.

The latex made was then utilized in making a clear coat formulation. It was prepared by mixing wetting agents, a coalescing system, plasticizers, and thickening agents into the latex. The clear coat formulation made was determined to have excellent storage stability. One year of storage was simulated by storing the clear coat formulation for one week at a temperature of 52° C.

COMPARATIVE EXAMPLE 2

The polymerization procedure utilized in Example 1 was repeated in this experiment except for the fact that the additional styrene monomer and the additional n-butyl acrylate monomer were rapidly added in the second polymerization step. This caused the latex to become unstable and for coagulum formation to occur.

While certain representative embodiments and details have been shown for the purpose of illustrating the subject invention, it will be apparent to those skilled in this art that various changes and modifications can be made therein without departing from the scope of the subject invention.

What is claimed is:

1. A process for preparing a latex having a high solids content which comprises the steps of (1) terpolymerizing a vinyl aromatic monomer, an alkyl propenoic acid ester monomer, and an alkyl propenoic acid monomer in an aqueous polymerization medium by free radical polymerization in a first polymerization step to produce a seed polymer latex; (2) neutralizing the seed polymer latex to a pH of about 7 to about 10 by the addition of ammonia to produce a neutralized seed polymer latex; (3) adding additional vinyl aromatic monomer and alkyl propenoic acid ester monomer to the neutralized seed polymer latex and allowing the additional vinyl aromatic monomer and the additional alkyl propenoic acid ester monomer to polymerize in a second polymerization step to a solids content of at least about 40% to produce the latex having the high solids content; wherein about 20 percent to about 40 percent of the total amount of monomers polymerized in the first polymerization step and the second polymerization step are polymerized in the first polymerization step; wherein at least about 90 percent of the total amount of the alkyl propenoic acid monomer polymerized in the first polymerization step and the second polymerization step is polymerized in the first polymerization step; and wherein the additional vinyl aromatic monomer and the additional alkyl propenoic acid ester monomer are added in the second polymerization step at rate whereby a monomer conversion of at least 85 percent is maintained at all times.

2. A process as specified in claim 1 wherein the first polymerization step is carried out at a temperature which is within the range of about 65° C. to about 99° C.

3. A process as specified in claim 2 wherein the second polymerization step is carried out at a temperature which is within the range of about 50° C. to about 90° C.

4. A process as specified in claim 3 wherein at least about 95 percent of the total amount of alkyl propenoic acid polymerized is polymerized in the first polymerization step.

5. A process as specified in claim 4 wherein a total of about 58 phm to about 72 phm of the vinyl aromatic monomer is polymerized in the first polymerization step and the second polymerization step; wherein a total of about 27 phm to about 37 phm of the alkyl propenoic acid ester monomer is polymerized in the first polymerization step and the second polymerization step; and wherein a total of about 1 phm to about 5 phm of the alkyl propenoic acid monomer is polymerized in the first polymerization step and the second polymerization step.

6. A process as specified in claim 5 wherein to seed polymer latex is neutralized in step (2) to a pH which is within the range of about 9 to about 10.

7. A process as specified in claim 6 wherein the vinyl aromatic monomer is styrene; wherein the alkyl propenoic acid ester monomer is n-butyl acrylate; and wherein the alkyl propenoic acid monomer is methacrylic acid.

8. A process as specified in claim 7 wherein about 25 percent to about 36 percent of the total amount of monomers polymerized in the first polymerization step and the second polymerization step are polymerized in the first polymerization step.

9. A process as specified in claim 8 wherein the additional styrene monomer and the additional n-butyl acrylate monomer are added in the second polymerization step at rate whereby a monomer conversion of at least 90 percent is maintained at all times.

10. A process as specified in claim 9 wherein the first polymerization step is carried out at a temperature which is within the range of about 80° C. to about 98° C.

11. A process as specified in claim 10 wherein the second polymerization step is carried out at a temperature which is within the range of about 55° C. to about 85° C.

12. A process as specified in claim 11 wherein at least about 99 percent of the total amount of methacrylic acid polymerized is polymerized in the first polymerization step.

13. A process as specified in claim 12 wherein a total of about 62 phm to about 70 phm of the styrene monomer is polymerized in the first polymerization step and the second polymerization step; wherein a total of about 28 phm to about 34 phm of the n-butyl acrylate monomer is polymerized in the first polymerization step and the second polymerization step; and wherein a total of about 2 phm to about 4 phm of methacrylic acid monomer is polymerized in the first polymerization step and the second polymerization step.

14. A process as specified in claim 13 wherein about 28 percent to about 33 percent of the total amount of monomers polymerized in the first polymerization step and the second polymerization step are polymerized in the first polymerization step.

15. A process as specified in claim 14 wherein the first polymerization step is carried out at a temperature which is within the range of about 90° C. to about 95° C.

16. A process as specified in claim 15 wherein the second polymerization step is carried out at a temperature which is within the range of about 60° C. to about 80° C.

17. A process as specified in claim 16 wherein virtually 100% of the methacrylic acid polymerized is polymerized in the first polymerization step.

18. A process as specified in claim 1 wherein the alkyl propenoic acid has the structural formula:

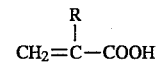

wherein R represents a hydrogen atom or an alkyl group containing from 1 to 4 carbon atoms.

19. A process as specified in claim 1 wherein the alkyl propenoic acid ester monomer has the structural formula:

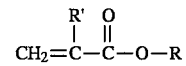

wherein R represents an alkyl group containing from 1 to 10 carbon atoms and wherein R' represents a hydrogen atom or a methyl group.

20. A process as specified in claim 19 wherein R' represents a hydrogen atom.

21. A process as specified in claim 4 wherein the additional vinyl aromatic monomer and the additional alkyl propenoic acid monomer are added in the second polymerization step at a rate whereby a monomer conversion of at least 90 percent is maintained at all times.

\* \* \* \* \*